United States Patent
Borho et al.

[11] Patent Number: 5,818,205
[45] Date of Patent: Oct. 6, 1998

[54] VOLTAGE TRANSFORMER

[75] Inventors: Lothar Borho, Willstaett; Manfred Knuetel, Garching, both of Germany

[73] Assignee: Robert Bosch GmbH, Stuttgart, Germany

[21] Appl. No.: 652,510

[22] PCT Filed: Nov. 24, 1994

[86] PCT No.: PCT/DE94/01393

§ 371 Date: Aug. 23, 1996

§ 102(e) Date: Aug. 23, 1996

[87] PCT Pub. No.: WO95/15608

PCT Pub. Date: Jun. 8, 1995

[30]    Foreign Application Priority Data

Dec. 1, 1993   [DE]   Germany .................. 43 40 991.1

[51] Int. Cl.$^6$ .................................................. G05F 1/40
[52] U.S. Cl. ..................... 323/282; 323/285; 315/307
[58] Field of Search ................................. 323/282, 284, 323/285; 363/21, 97; 315/307, 224

[56]    References Cited

U.S. PATENT DOCUMENTS

| | | | |
|---|---|---|---|
| 4,132,925 | 1/1979 | Schmutzer et al. ............... | 315/307 |
| 4,642,550 | 2/1987 | Illuzzi et al. . | |
| 5,402,056 | 3/1995 | Ketterling ................... | 320/6 |
| 5,457,379 | 10/1995 | Jacobs et al. .............. | 323/282 |
| 5,506,493 | 4/1996 | Stengel ..................... | 323/285 |
| 5,517,399 | 5/1996 | Yamauchi et al. ............. | 363/89 |

OTHER PUBLICATIONS

U. Tietze et al.: "Halbleiter–Schaltungstechnik". [Semiconductor Circuit Engineering], 9th edition, Springer Verlag 1989, pp. 561–572.

"Aufwärts—/Abwärts–Schaltregler". In: Elektronik, 26/27 Dec. 1985, pp. 57–59.

*Primary Examiner*—Stuart N. Hecker
*Attorney, Agent, or Firm*—Spencer & Frank

[57]    ABSTRACT

A voltage transformer with storage reactor (15) and with at least one circuit breaker (14, 14a, 22, 22a), in which the current flowing in the storage reactor (15) establishes the turning off and turning on of the circuit breaker (14, 14a, 22, 22a). A comparator (33) compares the current flowing in the storage reactor (15) to a stipulated threshold value. The circuit breaker (14, 14a, 22, 22a) is when the threshold value is traversed. A timer (17, 17a, 17b), after a voltage jump occurs on storage reactor (15), keeps the circuit breaker (14, 14a, 22, 22a) in the existing switching state for the time fixed by the timer (17, 17a, 17b). The voltage transformer according to the invention can be built with a few discrete components in an extremely cost-favorable manner. One preferred application is given in a motor vehicle.

9 Claims, 2 Drawing Sheets

VOLTAGE TRANSFORMER

PRIOR ART

The present invention relates to a voltage transformer of the type including a storage reactor, at least one circuit breaker, a sensor for acquiring a current flowing in the storage reactor, and means for comparison of the acquired current with a stipulated threshold value and for switching the circuit breaker when the threshold value is traversed. A technical book by U. Tietze and Ch. Schenk, *Semiconductor Circuit Engineering*, 9th edition, Springer-Verlag 1989, pages 561–572 describes voltage transformers which transform one direct current voltage into a stipulated direct current voltage at the output. Voltage transformers are based on a clocked switching principle in which the inductive energy stored in an inductive element is fixed depending on the ratio between the make time and the break time of a circuit breaker. The simplest circuits contain simply one circuit breaker and one storage reactor. A smoothing capacitor located at the output of the AC voltage transformer reduces the AC voltage portion in the output voltage. Chapter 18.6.1 of the above mentioned book describes three basic forms of voltage transformers. They are down transformers, up transformers, and inverting transformers. In chapter 18.6.2, an example of a down transformer circuit is shown in which the output voltage is controlled to a stipulated voltage. The control circuit and the modules necessary for driving the circuit breaker are contained in an integrated circuit.

SUMMARY OF THE INVENTION

The object of present the invention is to provide a voltage transformer which can be built especially cost-favorably.

The above object generally is achieved by a voltage transformer including a storage reactor, at least one circuit breaker, a sensor for acquiring a current flowing in the storage reactor, and means for comparison of the acquired current with a stipulated threshold value and for switching the circuit breaker when the threshold value is traversed, and further comprising a timer which, after a voltage jump occurs on the storage reactor as a result of switching of the circuit breaker, keeps the circuit breaker in the existing switching state for the time fixed by timer.

ADVANTAGES OF THE INVENTION

The voltage transformer according to the invention has the advantage that only a few discrete components are necessary. The voltage transformer according to the invention can therefore be built especially cost-favorably. According to the invention it is provided that a sensor for acquiring a current flowing in a storage reactor and means for comparison of the acquired current with a stipulated threshold value are provided. When the threshold value is traversed the circuit breaker is connected. Furthermore, there is a timer which after a voltage jump occurs on the storage reactor keeps the circuit breaker in the existing state for the time fixed by the timer. The voltage jump on the storage reactor occurs as a result of switching of the circuit breaker. The timer fixes the break time or make time of the clocked voltage transformer.

Advantageous developments and embodiments of the voltage transformer according to the invention are described.

According to a first advantageous embodiment of the voltage transformer according to the invention it is provided that when the threshold value is exceeded the circuit breaker is turned off. The timer then keeps the circuit breaker in the off state for the time fixed by the timer. This embodiment is especially advantageous for a fluctuating input voltage.

According to another advantageous embodiment of the voltage transformer according to the invention it is provided that when the threshold value is not reached the circuit breaker is turned on. The timer keeps the circuit breaker in the on state for the time fixed by the timer after the voltage jump has occurred on the storage reactor. In this embodiment the timer fixes the make time of the circuit breaker. This embodiment is especially suited in voltage transformers with an input voltage which is relatively constant.

One especially economical current sensor is an ohmic resistance on which the flowing current causes a voltage drop which is evaluated. As the comparison means especially a transistor is suited with a control voltage which is necessary for enabling the transistor and which constitutes a measure of the threshold value to be stipulated. The transistor is called a control transistor in the following.

One advantageous embodiment relates to a timer which is preferably built as a resistor-capacitor combination. The timer can be connected to a control input of the circuit breaker. Preferably the timer is connected to the control terminal of the control transistor.

One especially advantageous development calls for a voltage limiting element to be provided which is connected to the output of the voltage transformer. When a limiting voltage is exceeded the voltage limiting element keeps the circuit breaker in the off state. Like the timer, the voltage limiting element can be connected either directly to the control input of the circuit breaker or preferably to the control terminal of the control transistor. With this measure not only is the output voltage of the voltage transformer limited to a stipulated maximum value achieved, but the output voltage is also stabilized. Stabilization takes place by the fact that the output voltage has a tendency to rise to higher values for the underlying simple clocked switching concept as the load currents become smaller. This rise is reliably prevented. Stabilization of the output voltage is associated therewith.

Another especially advantageous development calls for a combination of a down transformer with an up transformer, in which simply one storage reactor forms the required common inductive element. The important advantage of the combination of down transformer and up transformer lies in that the input voltage of the voltage transformer can have values which lie both above and below the stipulated output voltage.

Other advantageous developments and embodiments of the voltage transformer according to the invention follow from the following description.

DETAILED DESCRIPTION OF THE PREFERRED EMBODIMENTS

Figure 1:
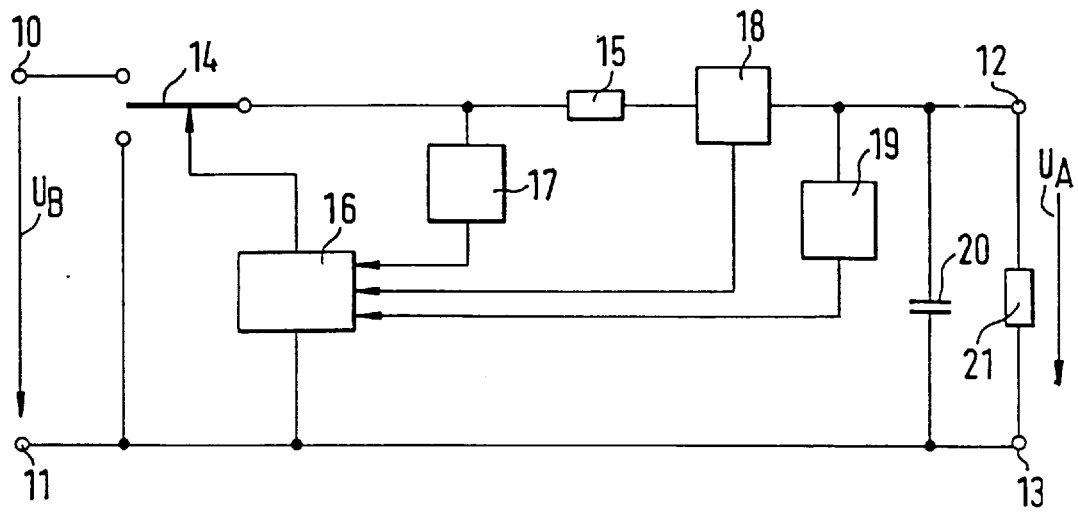
FIG. 1 shows a block diagram of a voltage transformer according to the invention which is wired as a down converter.

FIG. 1 shows a block diagram of a down transformer which converts a DC voltage $U_B$ which is between two input terminals 10, 11 into output voltage $U_A$ which can be tapped between two output terminals 12, 13. There is circuit breaker 14 which connects storage reactor 15 either to input terminal 10 or to other input terminal 11. Circuit breaker 14 is actuated by drive circuit 16 which receives the input signals supplied by timer 17, current sensor 18, and voltage limiting element 19. In the embodiment shown, timer 17 is connected to a connection between circuit breaker 14 and storage reactor 15. In the embodiment shown, current sensor 18, which acquires the current flowing in storage reactor 15, is located on the output side after storage reactor 15. Voltage limiting element 19 is connected to output terminal 12. Smoothing capacitor 20 and load 21 are connected between output terminals 12, 13.

Figure 2:
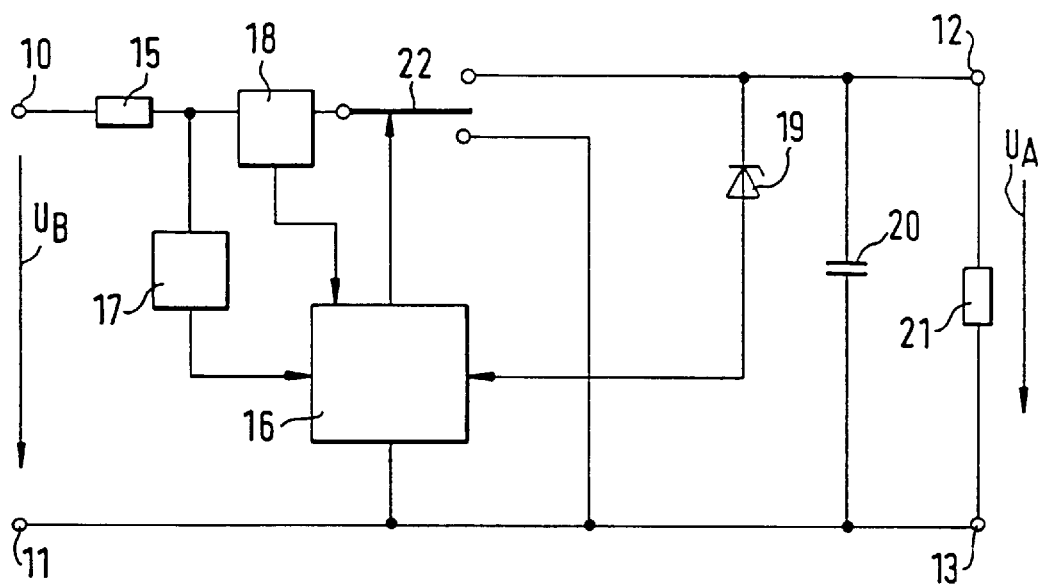
FIG. 2 shows a block diagram of a voltage transformer according to the invention which is wired as an up transformer.

FIG. 2 shows a block diagram of an up transformer. Those parts shown in FIG. 2 which match the parts shown in FIG. 1 each have the same reference number. Storage reactor 15 is connected directly to input terminal 10. Circuit breaker 22 located on the output side after storage reactor 15 on the output side connects the storage reactor 15 either to output terminal 12 or to input terminal 11.

Figure 3:
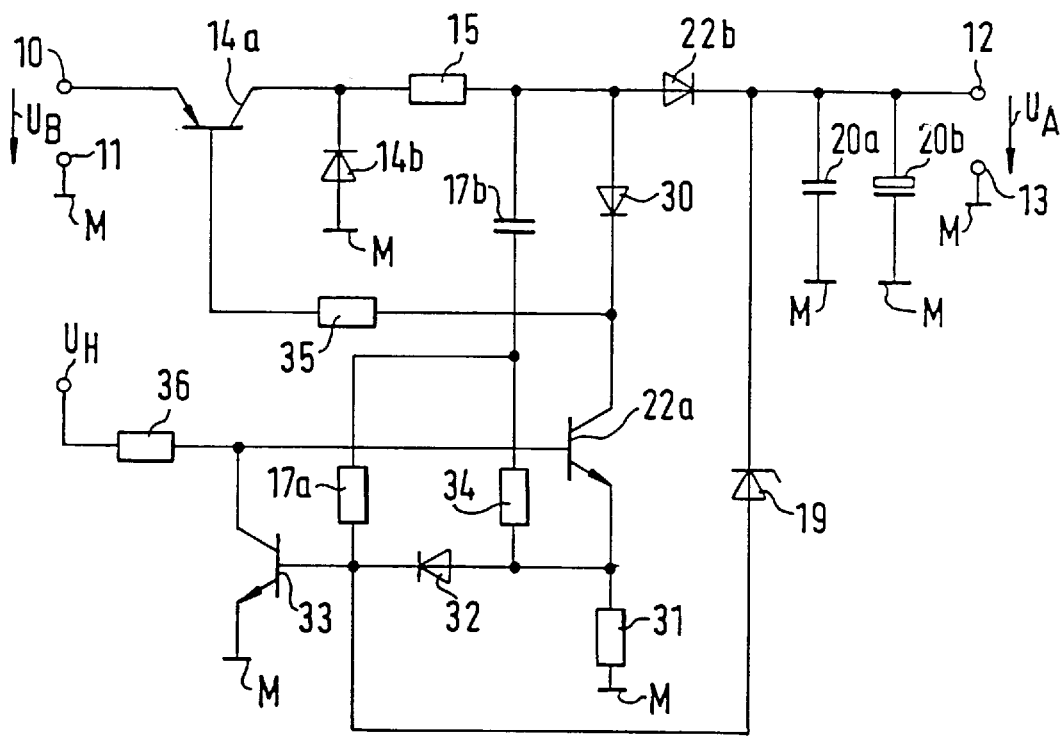
FIG. 3 shows a detailed circuit diagram of a down-up transformer.

FIG. 3 shows a detailed circuit diagram of a down-up transformer, the parts shown in FIG. 3 which match the parts shown in FIGS. 1 and 2 each having the same reference number. Circuit breaker 14 shown in FIG. 1 is replaced by first switching transistor 14a in conjunction with first free-wheeling diode 14b. An emitter terminal of first switching transistor 14a is connected to input terminal 10. The other input terminal 11 is connected to ground M. A collector terminal of first switching transistor 14a is connected to storage reactor 15. The cathode terminal of first free-wheeling diode 14b, with its anode connected to ground M, is connected to the connection between first switching transistor 14a and storage reactor 15.

Circuit breaker 22 shown in FIG. 2 is replaced in FIG. 3 by second switching transistor 22a in conjunction with second free-wheeling diode 22b. Second free-wheeling diode 22b is connected to storage reactor 15. Smoothing capacitor 20 shown in FIGS. 1 and 2 is divided in FIG. 3 into first smoothing capacitor 20a with a small capacitance and second smoothing capacitor 20a with a high capacitance. At the connection of the second free-wheeling diode 22b and the storage reactor 15 is isolating diode 30 which leads to a collector terminal of the second switching transistor 22a whose emitter terminal which is connected via current measuring resistor 31 to ground M. Protective diode 32 with a cathode terminal connected to the base terminal of control transistor 33 is furthermore connected to the current measuring resistor 31.

The base terminal of control transistor 33 is furthermore connected to resistor 17a which is part of a resistor-capacitor combination which contains another capacitor 17b. Resistor-capacitor combination 17a, 17b forms timer 17 which is shown in FIGS. 1 and 2. Capacitor 17b is connected on the output side to storage reactor 15. Charging resistor 34 which leads to the emitter terminal of the second switching transistor 22a is connected to the connection between capacitor 17b and resistor 17a of resistor-capacitor combination 17a, 17b. The collector terminal of the second switching transistor 22a, which is connected to the cathode terminal of isolating diode 30, is connected via current limiting resistor 35 to a base terminal of the first switching transistor 14a.

Both a collector terminal of control transistor 33 as well as a base terminal of second switching transistor 22a are connected together and to an auxiliary voltage $U_H$ via load resistance 36.

Voltage limiting element 19 is connected between output terminal 12 and the base terminal of control transistor 33.

How the voltage transformer according to the invention works is detailed first of all using the block diagram shown in FIG. 1.

The voltage transformer is built as a simple reactor transformer with storage reactor 15, the principles of which are given in the prior art mentioned initially. A down converter is assumed which converts voltage $U_B$ which is between input terminals 10, 11 into lower output voltage $U_A$ which occurs between output terminals 12, 13. In addition to storage reactor 15, an important element is circuit breaker 14 which fixes the magnetic energy stored in storage reactor 15 as a function of time in which circuit breaker 14 connects storage reactor 15 to input terminal 10. The resulting output voltage depends, besides this time which is called the make time, on the duration of the break time during which circuit breaker 14 connects storage reactor 15 to the other input terminal 11. According to the invention, it is provided that the make time or the break time of circuit breaker 14 depends on the current flowing in storage reactor 15. To acquire the current there is sensor 18 which has means for comparison of the acquired current with a stipulated threshold value. Depending on passage through the threshold value, the signal delivered by current sensor 18 is supplied to drive circuit 16.

According to a first embodiment it is provided that when a stipulated threshold value of the current flowing in storage reactor 15 is exceeded, there is a breaking operation of circuit breaker 14 which corresponds to a connection of storage reactor 15 via circuit breaker 14 with input terminal 11.

According to another embodiment it is provided that when a stipulated threshold value of the current flowing in storage reactor 15 is not reached, a making operation of circuit breaker 14 is provided in which storage reactor 15 is connected to input terminal 10.

There is timer 17 which, depending on the embodiment, fixes either the break time or the make time of circuit breaker 14. Timer 17 is driven by a voltage jump which occurs on storage reactor 15 in a switching process of circuit breaker 14. The voltage on storage reactor 15 jumps at the connection between storage reactor 15 and circuit breaker 14 between the voltages which occur on one input terminal 10 or on other input terminal 11.

Output voltage $U_A$ which occurs between output terminals 12, 13 and which corresponds to the operating voltage of load 21 can be stabilized with voltage limiting element 19, for example, a Zener diode, to a stipulated value. When the voltage on output terminal 12 is exceeded by the voltage stipulated by the voltage limiting element, the voltage limiting element delivers a signal to drive circuit 16 which thereupon increases the break time to a value which is enough to maintain the voltage on terminal 12.

The up transformer shown in FIG. 2 as a block diagram operates as follows:

The voltage transformer according to the invention according to FIG. 2 transforms input voltage $U_B$ which is between input terminals 10, 11 into higher output voltage $U_A$ which occurs between output terminals 12, 13. The important difference from the down converter according to FIG. 1 lies in that instead of circuit breaker 14 there is a different circuit breaker 22 which is located on the output side after storage reactor 15. Circuit breaker 22 on the output side connects storage reactor 15 either to output terminal 12 or input terminal 11.

While in the embodiment shown in FIG. 1 a current flow always occurs between storage reactor 15 and output terminal 12 or smoothing capacitor 20, in the embodiment according to FIG. 2 interruptions occur in the current flow between storage reactor 15 and output terminal 12 or smoothing capacitor 20. The down transformer according to FIG. 1 is therefore also called a forward transformer and the up transformer according to FIG. 2 an isolating transformer.

The measures provided according to the invention, to switch circuit breaker 22 depending on the current flowing in storage reactor 15, and to maintain the assumed state depending on the time fixed by timer 17, agree in the embodiments. In the embodiment shown in FIG. 2 the make state of circuit breaker 22 is defined as that state in which storage reactor 15 is connected to input terminal 11.

The measures according to the invention are also suited to transformers which convert input voltage $U_B$ which lies between input terminals 10, 11 into other output voltage $U_A$ and at the same time invert the polarity.

Another, especially advantageous embodiment calls for a combination of a down converter with an up converter. The advantage of this combination lies in that input voltage $U_B$ which is between input terminals 10, 11 can be both above and below stipulated output voltage $U_A$. FIG. 3 shows a detailed circuit diagram of one such embodiment with a combination of a down transformer and an up transformer.

First power transistor 14a in conjunction with first free-wheeling diode 14b corresponds to circuit breaker 14 shown in FIG. 1 and second power transistor 22a in conjunction with second free-wheeling diode 22b corresponds to circuit breaker 22 shown in FIG. 2. Storage reactor 15 is provided for the two transformers together.

The circuit shown in FIG. 3 is, for example, switched off when the current flowing in storage reactor 15 exceeds the threshold value; this results in shut-off of switching transistors 14a, 22a. Timer 17 built with resistor-capacitor combination 17a, 17b fixes the break time of two switching transistors 14a, 22a.

The circuit shown in FIG. 3 operates as follows:

After input voltage $U_B$ is applied between input terminals 10, 11 and after auxiliary voltage $U_H$ occurs, two switching transistors 14a, 22a are first turned on. Current flows via first switching transistor 14a, via storage reactor 15, via isolating diode 30, via second switching transistor 22a, and via current measuring resistor 31 to ground M which is identical to input terminal 11. As the current increases the voltage which can be tapped at current measurement resistor 31 rises. The current rise and thus the voltage rise on current measuring resistor 31 continues until control transistor 33 switches through. The control voltage of control transistor 33 accordingly fixes the threshold value to be stipulated as a measure of the current flowing in storage reactor 15. If control transistor 33 switches through, second transistor 22a is turned off, as is first switching transistor 14a via current limiting resistor 35. The current flowing in storage reactor 15 tends to continue to flow. It switches from first switching transistor 14a to first free-wheeling diode 14b. The voltage on storage reactor 15 on the input side is drawn to almost ground potential by first free-wheeling diode 14b. On the output side conversely the potential on storage reactor 15 jumps to a higher potential so that second free-wheeling diode 22b conducts and connects storage reactor 15 to output terminal 12. The current flows either into a load which is not detailed in FIG. 3 or into the smoothing capacitor which is composed in the embodiment shown of a first smoothing capacitor 20a with a small capacitance and of second smoothing capacitor 20b with a high capacitance.

After turning off two power transistors 14a, 22a the current flowing in current measuring resistor 31 becomes zero. The switching condition for control transistor 33 would thus be cleared. In order to avoid this state, timer 17 is provided which is built in the embodiment shown as resistor-capacitor combination 17a, 17b. The voltage jump which occurs on the output side on storage reactor 15, in the embodiment shown a positive voltage jump, keeps control transistor 33 for a stipulated time in the enabled state via resistor-capacitor combination 17a, 17b. The time is fixed by the time constants of resistor-capacitor combination 17a, 17b. After capacitor 17b is charged, control transistor 33 is switched off. With this the break time is ended; the make time begins. A period is completed when the switching threshold is reached again for switching through control transistor 33 as a function of the potential which occurs on current measuring resistor 31.

After turning off control transistor 33, capacitor 17b is charged via charging resistor 34. During the turning-off operation the potential on capacitor 17b jumps to negative values. In order that the voltage on the base terminal of control transistor 33 not become negative, for example <−0.5 V, protective diode 32 is provided which negatively clamps the voltage to harmless values.

Voltage limiting element 19 which is built as a Zener diode limits output voltage $U_A$ which can be tapped between output terminals 12, 13 to a stipulated value. Breakthrough of Zener diode 19 leads to switching through of control transistor 33 and thus immediately to disconnecting two switching transistors 14a, 22a. Optionally there can be a protective resistor between the base terminal of control transistor 33 and Zener diode 19, especially when output voltage $U_A$ is above the allowable base-emitter voltage of control transistor 33. Voltage limiting element 19, regardless of the current flowing in storage reactor 15, can cause power transistors 14a, 22a to be turned off. Furthermore, voltage limiting element 19 can optionally prolong the break time independently of the time stipulated by timer 17. Use of voltage limiting element 19 enables constant output voltage $U_A$ to be made available. Even without use of voltage limiting element 19 output voltage $U_A$ remains constant within certain limits, the limits being fixed especially by the current which flows through load 21. Without voltage limiting element 19 control is based exclusively on the current flowing in storage reactor 15 in conjunction with current measuring resistor 31 and control transistor 33 which acts as a comparator and as a switch.

We claim:

1. In a voltage transformer with a storage reactor (15) and with at least one circuit breaker (14), with a sensor (18, 31) for acquiring a current flowing in the storage reactor (15), and with means (33) for comparison of the acquired current with a stipulated threshold value and for switching the circuit breaker (14, 14a, 22, 22a) when the threshold value is traversed, and further comprising a timer (17, 17a, 17b) which, after a voltage jump occurs on the storage reactor (15) as a result of switching of the circuit breaker (14, 14a, 22, 22a), keeps the circuit breaker (14, 14a, 22, 22a) in the existing switching state for the time fixed by the timer (17, 17a, 17b), and a voltage limiting element (19) which is connected to an output terminal (12) of the voltage transformer and which when a limiting output voltage is exceeded controls the means for comparing, independently of the measured current flowing in the storage reactor the circuit breaker (14, 14a, 22, 22a) in the off state.

2. Voltage transformer according to claim 1, wherein when the threshold value is exceeded the circuit breaker (14, 14a, 22, 22a) is turned off, and wherein the circuit breaker (14, 14a, 22, 22a) is in the off state for the time fixed by the timer (17, 17a, 17b).

3. Voltage transformer according to claim 1, wherein when the threshold value is not reached of the circuit breaker (14, 14a, 22, 22a) is turned on, and wherein the circuit breaker (14, 14a, 22, 22a) is in the on state for the time fixed by the timer (17, 17a, 17b).

4. Voltage transformer according to claim 1, wherein a current measuring resistor (31) is provided as the sensor.

5. Voltage transformer according to claim 1, wherein the comparison means is especially a control transistor (33), with the threshold value for comparison being given by the make voltage of the control transistor (33).

6. Voltage transformer according to claim 1, wherein the timer (17) is a resistor-capacitor combination (17a, 17b).

7. Voltage transformer according to claim 1, wherein a Zener diode is utilized as the voltage limiting element (19).

8. Voltage transformer according to claim 1, wherein the transformer includes a combination of a down converter and an up converter with a common storage reactor (15).

9. A motor vehicle including an electrical system with a voltage transformer according to claim 1.

* * * * *